United States Patent [19]

Yamamoto et al.

[11] Patent Number: 4,740,797
[45] Date of Patent: Apr. 26, 1988

[54] THERMO-MAGNETIC RECORDING DEVICE

[75] Inventors: Takemi Yamamoto; Isao Kawano, both of Nagoya, Japan

[73] Assignee: Brother Kogyo Kabushiki Kaisha, Aichi, Japan

[21] Appl. No.: 923,272

[22] Filed: Oct. 27, 1986

[30] Foreign Application Priority Data

Oct. 31, 1985 [JP] Japan ................................ 60-244945

[51] Int. Cl.$^4$ ............................................. G01D 15/00
[52] U.S. Cl. .................... 346/74.4; 346/76 R
[58] Field of Search .............. 346/76 R, 76 PH, 74.2, 346/74.4, 162; 400/120, 119; 101/DIG. 5; 358/301; 250/317.1, 318, 319; 219/216 PH

[56] References Cited

U.S. PATENT DOCUMENTS 4,236,834 12/1980 Hafer et al. ................... 346/76 R
4,442,441 4/1984 Kikuchi et al. ................ 346/74.4

FOREIGN PATENT DOCUMENTS 115278 10/1981 Japan ............................ 346/74.4

Primary Examiner—Arthur G. Evans
Attorney, Agent, or Firm—Parkhurst & Oliff

[57] ABSTRACT

A thermo-magnetic recording device wherein a magnetized latent image is produced on a magnetic layer by locally heating the magnetic layer. The device includes a heat-generating ribbon for generating heat upon energization thereof, at least one working electrode movable relative to the magnetic layer in a recording direction, and relative to the heat-generating ribbon in sliding contact with the heat-generating ribbon, such that the at least one working electrode locally holds the heat-generating ribbon in contact with the magnetic layer, a deive for effecting a relative movement between the ribbon and the at least one working electrode, and at least one auxiliary electrode placed in direct or indirect contact with the heat-generating ribbon. An electric current is applied between the at least one working electrode and the at least one auxiliary electrode, to energize a local portion of the heat-generating ribbon which is currently in contact with the magnetic layer, thereby causing the energized portion of the heat-generating ribbon to generate heat for locally heating the magnetic layer to produce the magnetized latent image on the magnetic layer.

9 Claims, 3 Drawing Sheets

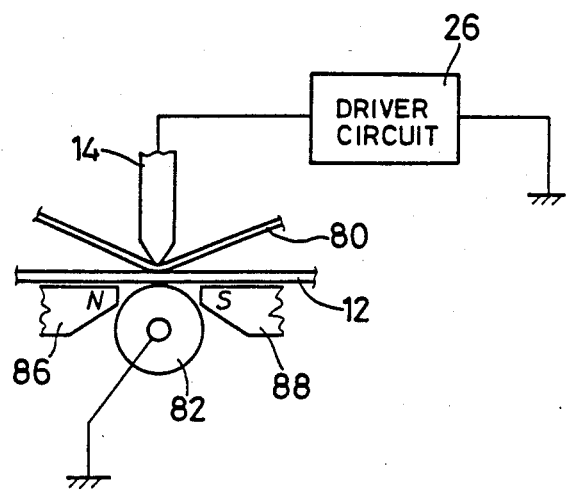

THERMO-MAGNETIC RECORDING DEVICE

BACKGROUND OF THE INVENTION

1. Field of the Invention

The present invention relates to improvements in a thermo-magnetic recording device wherein a magnetized latent image is produced on a magnetic layer.

2. Discussion of the Prior Art

There is known a thermo-magnetic recording device wherein a latent image is produced on a magnetic layer made of a ferromagnetic material, by locally heating the ferromagnetic layer. Commonly, this type of printer utilizing a thermo-magnetic recording technique uses a magnetic layer which is magnetized in the same direction over its entire recording area. The latent image is formed by reversing the direction of magnetization at individual local printing spots on the magnetic layer. The reversal of the magnetizing direction is accomplished by utilizing a residual magnetism which is obtained by first heating the magnetic layer to an elevated temperature near the Curie Point and then cooling the heated layer down to the room temperature in a magnetic field. This method of magnetization utilizing the residual magnetism after heating of the magnetic recording medium requires a reduced energy to produce the magnetic field to which the medium is exposed for reversed magnetization, as compared with the method wherein the magnetic medium is not heated prior to exposure to a magnetic field. Moreover, the former method assures substantially saturated magnetization of the recording medium by the residual magnetism.

For locally selectively heating the magnetic layer as a recording medium, it is considered to use a laser or xenon beam which is converged on a desired printing spot on the magnetic layer. However, this method requires an expensive, intricate optical system which includes a light source and a converging lens.

An alternative method of locally heating a magnetic recording layer is known, which uses a thermal printing head having a multiplicity of heat-generating elements arranged on a substrate. In this arrangement, a latent image is produced on the magnetic layer by selectively energizing the heat-generating elements while the thermal printing head is moved on the layer. An example of a magnetic recording device adapted to practice the above method is disclosed in Japanese Patent Application No. 55-18472 which was laid open in 1981 under Publication No. 56-115278 the subject matter of which is disclosed in U.S. Pat. No. 4,442,441 to Kikuchi et al. This device is capable of forming a latent image on a magnetic layer, with a relatively simple construction without an optical system.

However, the magnetic recording device using such a thermal printing head as indicated above suffers from accumulation of heat in the thermal printing head, which limits the frequency at which current pulses are applied to the heat-generating elements. Therefore, the rate of forming the latent image on the magnetic layer is accordingly limited. Since an overheat of the thermal printing head results in the failure to correctly form the latent image, the electric energy to be applied to the printing head must be limited. Hence, the operating efficiency of the recording or printing device is lowered.

SUMMARY OF THE INVENTION

It is accordingly an object of the present invention to provide a thermo-magnetic recording device, which is relatively simple in construction and relatively high in operating efficiency.

According to the invention, there is provided a thermo-magnetic recording device wherein a magnetized latent image is produced on a magnetic layer by locally heating the magnetic layer, the thermo-magnetic recording device comprising a heat-generating ribbon for generating heat upon energization thereof, at least one working electrode, feeding means for effecting a relative movement between the heat-generating ribbon and the at least one working electrode, at least one auxialiary electrode placed in direct or indirect contact with the heat-generating ribbon, and means for applying an electric current between the at least one working electrode and the at least one auxiliary electrode.

The above-indicated at least one working electrode is adapted to be movable relative to the magnetic layer in a recording direction, and relative to the heat-generating ribbon in sliding contact with the heat-generating ribbon, such that the working electrode or electrodes locally hold the heat-generating ribbon in contact with the magnetic layer. An electric current applied between the at least one working electrode and the at least one auxiliary electrode, will energize a local portion of the heat-generating ribbon which is currently in contact with the magnetic layer and the at least one working electrode, thereby causing the energized local portion of the heat-generating ribbon to generate heat for locally heating a portion of the magnetic layer corresponding to the energized local portion of the ribbon. Thus, the heated portion of the magnetic layer is magnetized to produce a latent image after it is cooled.

In the thermo-magnetic recording device of the present invention constructed as described above, a local portion of the electrically conductive heat-generating ribbon currently in contact with each working electrode and the magnetic layer will be heated upon energization thereof by an electric current pulse applied to the working electrode, and the auxiliary electrode in direct or indirect contact with the heat-generating ribbon. With the at least one working electrode moved in the recording direction, the desired spots on the magnetic layer are heated and magnetized in the same direction by the corresponding energized and heated portions of the heat-generating ribbon. In this manner, the desired latent image can be produced on the magnetic layer, by selective energization of the working electrode or electrodes during movement relative to the magnetic layer.

Since the electrically conductive heat-generating ribbon itself is locally selectively heated, and since this ribbon is moved relative to the at least one working electrode, heat is less likely to be accumulated in the working electrode or electrodes. Consequently, the instant arrangement permits current pulses to be applied to the working and auxiliary electrodes at a higher frequency or at a reduced interval. This means an improved speed of producing the latent image, i.e., improved operating efficiency.

According to the present invention, the heat-generating ribbon and the magnetic layer on which the latent image is formed can be made of different materials. Namely, the heat-generating ribbon may be made of a material which is suitable for generating heat, while the magnetic layer may be made of a material which is excellent in the residual magnetism produced by cooling after heating thereof.

A further advantage of the present invention lies in the indirect contact of the working electrode with the magnetic layer via the heat-generating ribbon, which results in increased durability of the magnetic layer that is generally expensive. In this connection, it is noted that the heat-generating ribbon is easily replaceable at the end of its service life.

According to one feature of the invention, the feeding means is adapted to feed the heat-generating ribbon relative to the at least one working electrode, in the recording direction.

According to another feature of the invention, the heat-generating ribbon consists of an endless tape, and the feeding means is adapted to feed the endless tape relative to the at least one working electrode, in a direction perpendicular to the recording direction.

According to a further feature of the invention, the thermo-magnetic recording device further comprises a cylindrical drum which is made of a non-magnetic material, and which has an outer circumferential surface for holding thereon the magnetic layer.

According to a still further feature of the invention, the heat-generating ribbon comprises an electrically conductive layer and an electrically resistive layer, and the feeding means comprises an electrically conductive roller supported rotatably in contact with the electrically conductive layer of the heat-generating ribbon. The above-indicated at least one working electrode is placed in sliding contact with the electrically resistive layer. In this arrangement, the above-indicated at least one auxiliary electrode is constituted by the electrically conductive roller of the feeding means.

According to a yet further feature of the invention, the heat-generating ribbon consists of an electrically resistive layer, and the at least one working electrode consists of a plurality of working electrode. The at least one auxiliary electrode consists of a plurality of auxiliary electrodes corresponding to the plurality of working electrodes. Each of the plurality of working electrodes and corresponding one of the plurality of auxiliary electrodes are spaced apart from each other by a predetermined distance and held in contact with said electrically resistive layer. The predetermined distance corresponding to a length of the local portion of the heat-generating ribbon to be energized by the electric current applied between the corresponding pair of working and auxiliary electrodes.

According to yet another feature of the invention, the magnetic layer is supported on an electrically conductive substrate. In this case, an electric current is applied between the at least one working electrode contacting the magnetic layer via the heat-generating ribbon, and the electrically conductive substrate, to locally heat the magnetic layer, whereby the electrically conductive substrate serves as the at least one auxiliary electrode.

According to still another feature of the invention, the magnetic layer is made of an electrically conductive material, and the at least one auxiliary electrode consists of an electrically conductive roller held in contact with one of opposite surfaces of the magnetic layer remote from the at least one working electrode. The current applying means is operable to apply the electric current between the at least one working electrode and the electrically conductive roller, to locally heat the magnetic layer.

BRIEF DESCRIPTION OF THE DRAWINGS

The above and other objects, features and advantages of the present invention will be better understood by reading the following detailed description of several preferred embodiments of the invention, when considered in connection with the accompanying drawings, in which:

FIG. 6 is a fragmentary elevational view showing a further modified embodiment of the invention.

DETAILED DESCRIPTION OF THE PREFERRED EMBODIMENTS

Figure 1:
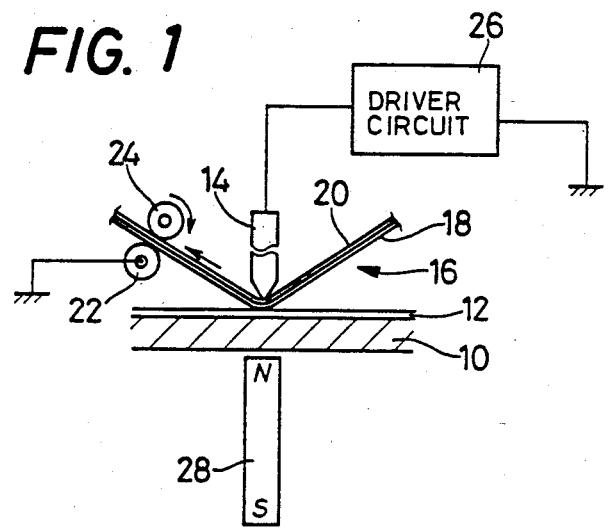
FIG. 1 is a schematic view illustrating one embodiment of a method of the invention for producing a latent image.

Referring first to FIG. 1, there is illustrated a method of forming a latent image according to one embodiment of the principle of the present invention. In the figure, reference numeral 10 designates a substrate made of a non-magnetic material such as aluminum, copper, or thier alloys. On one surface of this non-magnetic substrate 10, there is fixedly supported a well known magnetic layer 12, which is made of a material which can be magnetized by means of a residual magnetism, that is produced by cooling of the material after heating. For example, the magnetic layer 12 is preferably made of GdTbFe, TbFeCo or CrCo. The layer 12 is magnetized in the same direction normal to its plane, over the entire recording area. Above the exposed surface of the magnetic layer 12, an electrically conductive working electrode 14 is disposed such that the electrode 14 is moved relative to the magnetic layer 12 in a recording direction. The working electrode 12 has a wedge-shaped tip so that the tip is held in sliding contact with an electrically conductive heat-generating ribbon 16 which passes between the exposed surface of the magnetic layer 12 and the tip of the working electrode 14. As described below in greater detail, the working electrode 14 holds the heat-generating ribbon 16 so that the ribbon 16 is held in sliding contact with the magnetic layer 12, over a limited length as viewed in the recording direction.

The electrically conductive heat-generating ribbon 16 consists of an electrically conductive layer 18, and an electrically resistive layer 20 superposed on the conductive layer 18. As shown in FIG. 1, the heat-generating ribbon 16 is fed relative to the working electrode 14 and the magnetic layer 12, in sliding contact therewith, by feeding means which includes a pair of rollers 22, 24. Namely, the feeding means comprises an electrically conductive driving feed roller 22 which contacts the electrically conductive layer 18 of the ribbon 16, and a driven roller 24 which contacts the electrically resistive layer 20 of the ribbon 16. The driving feed roller 22 is driven by a feed motor not shown. The ribbon 16 is pinched by the two rollers 22, 24, and is fed continuously relative to the magnetic layer 12 and also to the working electrode 14, in the recording direction as indicated by an arrow in FIG. 1. The working electrode 14 is electrically connected to a driver circuit 26, while the electrically conductive feed roller 22 is connected to the ground. Current pulses generated by the driver circuit 26 are applied to the working electrode 14, so that the electric current flows to the ground through the electrode 14, the electrically resistive and conductive layers 20, 18 of the ribbon 18 and the electrically conductive feed roller 22. The feed roller 22 serves as an auxiliary electrode. On the side of the substrate 10 remote from the working electrode 14, there is disposed a permanent magnet 28 which is adapted to be moved with the working electrode 14. As indicated in FIG. 1, the portion of the magnetic layer 12 in sliding contact with the heat-generating ribbon 16 is positioned between the permanent magnet 28 and the working electrode 14. The permanent magnet 28 produces a magnetic field across the thickness of the magnetic layer 12, such that the N-S orientation adjacent to the working electrode 14 is opposite to that of the magnetic layer 12.

To form a latent image on the magnetic layer 12 in the arrangement described above, an electric current is applied so as to flow between the working and auxiliary electrodes 14, 22, while the electrode 14 is moved in the recording direction relative to the magnetic layer 12, and while the heat-generating ribbon 16 is fed relative to the working electrode 14 and magnetic layer 12, in the recording direction. As a result, the local portion of the electrically resistive layer 20 of the heat-generating ribbon 16 which contacts the working electrode 14 is heated, whereby the corresponding portion of the magnetic layer 12 contacting the heated portion of the ribbon 16 is heated to a temperature around the Curie Point. As the working electrode 14 is moved, the heated portion of the magnetic layer 12 is cooled, and is consequently magnetized vertically (in the direction of thickness) according to the magnetic field produced by the permanent magnet 28. Namely, the direction of magnetization of the heated and cooled portion of the pre-magnetized magnetic layer 12 is reversed, whereby a segment of the desired latent image is produced.

Figure 2:
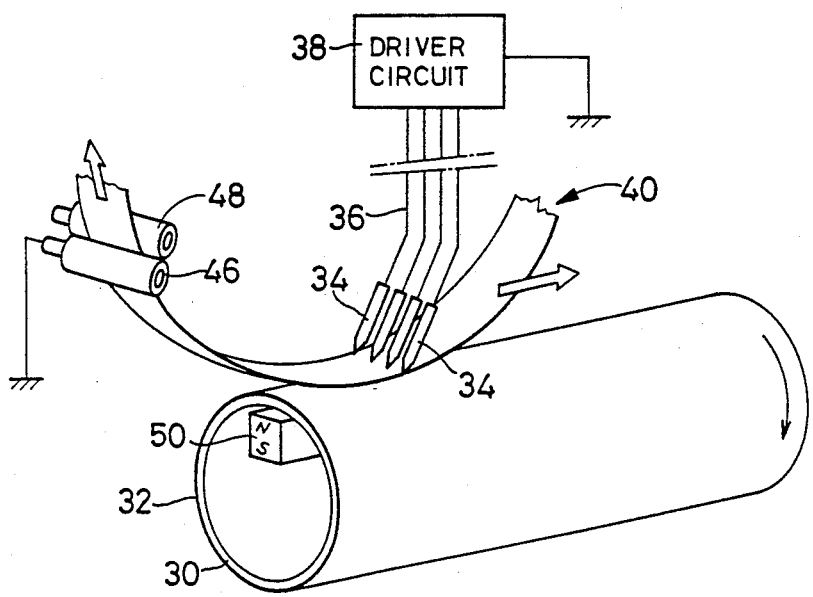
FIG. 2 is a fragmentary perspective view of one embodiment of a thermo-magnetic recording device of the invention, adapted to practice the method illustrated in FIG. 1.
Figure 3:
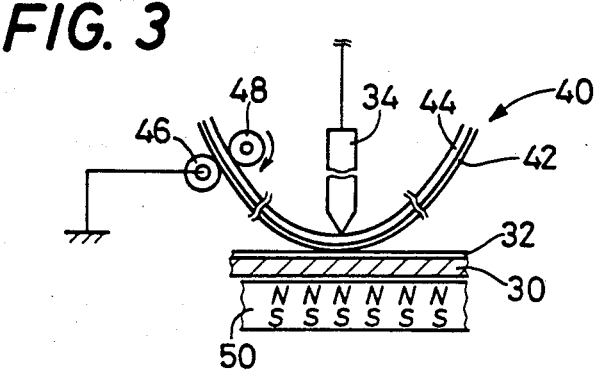
FIG. 3 is a fragmentary elevational view in transverse cross section of the recording device of FIG. 2.

Referring next to FIG. 2, there is illustrated a thermomagnetic recording device constructed according to the principle of the invention which is illustrated in FIG. 1. FIG. 3 shows a part of the device of FIG. 2 in cross section taken in a plane which includes the axis of a cylindrical drum 30. The drum 30 is made of a non-magnetic material, and is supported rotatably about its axis. The drum 30 supports on its outer circumferential surface a magnetic layer 32 similar to the magnetic layer 12. The magnetic layer 32 is pre-magnetized in the predetermined direction across the thickness. Adjacent to the drum 30, there is disposed a carriage (not shown) which is adapted to be moved in the recording direction parallel to the axis of rotation of the drum 30. The carriage carries a plurality of working electrodes 34 which are arranged in a row in the circumferential direction of the drum 30, i.e., in the direction perpendicular to the recording direction. The working electrodes 34 are disposed so that they are held in contact with the exposed surface of the magnetic layer 32, via an electrically conductive heat-generating ribbon 40 (which will be described). The working electrodes 34 are connected by conductors 36 to a driver circuit 38.

The electrically conductive heat-generating ribbon 40 consists of an electrically conductive layer 42 and an electrically resistive layer 44. The ribbon 40 may be fed in form of an endless tape, or supplied from a supply reel and wound on a take-up reel. In either case, the heat-generating ribbon 40 (in the form of an endless tape, or wound on the reels) is accommodated in a suitable casing. The ribbon 40 is guided, so that its active portion passes along the path of movement of the working electrodes 34, and is held in sliding contact with the working electrodes 34 and the magnetic layer 32 on the drum 30. A driving feed roller 48 cooperates with an electrically conductive driven roller 46 to pinch the heat-generating ribbon 40 therebetween. As the carriage carrying the working electrodes 34 is moved, the driving feed roller 48 is rotated to feed the ribbon 40 in the recording direction, relative to the working electrodes 34 and the magnetic layer 32, as indicated by an arrow in FIG. 2. The electrically conductive driven roller 46, which contacts the electrically conductive layer 42 of the ribbon 40, serves as an auxiliary electrode.

Inside the drum 30, there is disposed an elongate permanent magnet 50 which extends in the recording direction, in aligned relation with the working electrodes 34 in the circumferential direction of the drum 30. The permanent magnet 50 is spaced a small distance from the inner surface of the drum 30, so that a manetic field produced by the magnet 50 extends across the wall of the drum 30, so as to cover the portion of the magnetic layer 30 which contacts the heat-generating ribbon 40 (or the portion of the ribbon 30 which contacts the working electrodes 34).

When the instant thermo-magnetic recording device is operated to produce a latent image on the magnetic layer 32, the working electrodes 34 are reciprocated in the recording direction, while the drum 30 is continuously rotated to advance the line on the layer 32 to be scanned by the electodes 34. Thus, the entire recording area of the magnetic layer 32 is scanned by the working electrodes 34, to produce a latent image. More specifically, current pulses generated by the driver circuit 38 are selectively applied to the working electrodes 34 while the electrodes 34 are reciprocated. The applied current flows from the electrodes 34 to the ground through the electrically resistive layer 44, the electrically conductive layer 42 and the auxiliary electrode 46 in the form of the electrically conductive driven roller 46. As a result, the portions of the electrically resistive layer 44 of the heat-generating ribbon 40 which contact the energized working electrodes 34, generate Joule heat. Thus, the heat-generating ribbon 40 is locally heated. The Joule heat is transferred to the portions of the magnetic layer 32 which contact the heated portions of the ribbon 40. After the heated portions of the magnetic layer 32 are cooled, these portions are magnetized in the magnetic field of the permanent magnet 50, in the direction opposite to that of the pre-magnetization of the magnetic layer 32. In this manner, the heated spots on the magnetic layer 32 are magnetized in the reverse direction, whereby a latent image is magnetically formed on the magnetic layer 32, in a matrix of dots corresponding to the heated portions.

As described above, the desired spots on the magnetic layer 32 are heated by Joule heat generated by the portions of the heat-generating ribbon 40 which contact the working electrodes 34. Since the heat-generating ribbon 40 is fed relative to the working electrodes 40, heat will not be accumulated in the working electrodes 34. Accordingly, the period of the current pulses to be applied to the working electrodes 34 may be considerably reduced. That is, the operating efficiency of the instant device is improved, as compared with that of a conventional device using a thermal printing head with heat-generating elements. If the feed length of the heat-generating ribbon 40 per each pass of the working electrodes 34 is shorter than the length of the pass of the electrodes, a part of the portion of the ribbon 40 used in the last pass will be used in the next pass. However, that part of the ribbon 40 may be sufficiently cooled before it is heated again in the next pass. Therefore, heat will not be accumulated in the working electrodes 34 due to residual heat in the heat-generating ribbon 40.

The heat-generating ribbon 40 and the magnetic layer 32 are made of different materials. That is, the heat-generating ribbon 40 can be made of a material suitable for generating heat, while the magnetic layer 32 can be made of a material which is excellent in residual magnetism after heating and subsequent cooling.

Further, the durability of the magnetic layer 32 is improved, since the magnetic layer 32 does not directly contact the working electrodes 34, i.e., indirectly contacts the working electrodes 34 via the heat-generating ribbon 40. If the heat-generating ribbon 40 is worn out, it may be easily replaced with new one.

While the preferred embodiment of the thermo-magnetic recording device has been described referring to FIGS. 2 and 3, the present invention may be otherwise embodied.

For example, the magnetic layer 32 may be pre-magnetized, or magnetized by the permanent magnet 50, in the horizontal direction (parallel to the plane of the layer 32), contrary to the vertical magnetization in the direction normal to the plane of the layer 32, as in the illustrated embodiment of FIGS. 2 and 3. In this case, the permanent magnet must be modified so that their magnetic poles are spaced apart from each other in the direction parallel to the plane of the magnetic layer 32, and so that the gap between the magnetic poles is aligned with the working electrodes 34.

Figure 4:
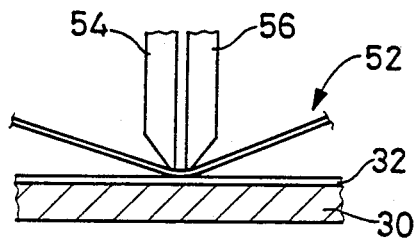
FIGS. 4 and 5 are fragmentary views showing modified embodiments of the invention.

Another modified arrangement of the invention is illustrated in FIG. 4, which uses a heat-generating ribbon 52 consisting of a single electrically resistive layer. This heat-generating ribbon 52 is locally held in sliding contact with a pair of electrodes 54, 56 and the magnetic layer 32. The two electrodes 54, 56 are spaced apart from each other by a predetermined small distance which corresponds to the desired length over which the ribbon 52 is locally heated upon application of an electric current to the electrodes. In this case, one of the two electrodes 54, 56 functions as a working electrode corresponding to the electrode 14, 34, while the other electrode functions as an auxiliary electrode corresponding to the roller 22, 46.

Figure 5:
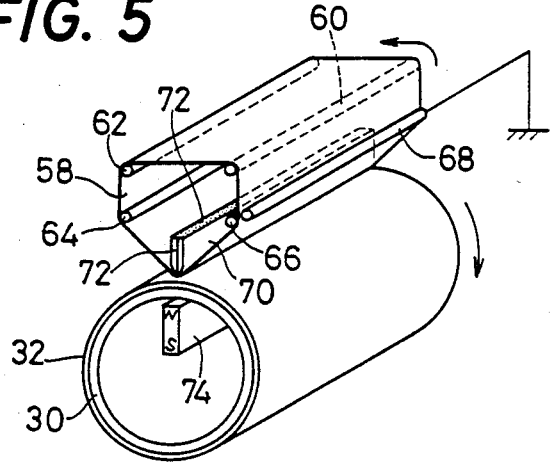

A further modified arrangement embodying the present invention is illustrated in FIG. 5, which uses a heat-generating ribbon 58 in the form of an endless tape or strip having a width substantially equal to the length of the drum 30. The ribbon 58 consists of an electrically conductive layer and an electrically resisitive layer. The endless ribbon 58 is guided by guide rollers 60, 62, 64 and 66, and a multiplicity of needle-like working electrodes 72 which are supported by an elongate holder 70. The holder 70 extends parallel to the axis of the drum 30, so that the endless ribbon 58 is locally pinched between the working electrodes 72 and the magnetic layer 32. The ribbon 58 is fed along a line of printing or recording, by an electrically conductive feed roller 68 which cooperates with the guide roller 66 to pinch the ribbon 58. The needle-like working electrodes 72 are arranged in a row so as to cover the length of the drum 30, or the length of the recording line on the magnetic layer 32. As in the embodiment of FIGS. 2 and 3, an electric current is applied selectively to the working electrodes 72. The applied current flows to the ground through the feed roller 68, which serves as an auxiliary electrode. An elongate permanent magnet 74 is fixedly disposed within the drum 30, such that the magnet 74 is aligned with the electrode holder 70, in the circumferential direction of the drum 30, as in the embodiment of FIGS. 2 and 3.

Still another embodiment of the invention is depicted in FIG. 6, which uses a heat-generating ribbon 80 consisting of a single electrically resistive layer. This ribbon 80 is held at its active portion between the working electrode 14 and one of opposite surfaces of the electrically conductive magnetic layer 12. An electrically conductive roller 82 is disposed so that the roller 82 is held in contact with the other surface of the magnetic layer 12, as shown in the figure. In this case, an electric current is applied between the working electrode 14 which contacts the magnetic layer 12 via the ribbon 80, and the electrically conductive roller 82 which serves as an auxiliary electrode. The present embodiment uses a pair of permanent magnets 86, 88 to produce a magnetic field in the direction parallel to the plane of the magnetic layer 12.

Referring back to FIG. 1, it is possible that the substrate 10 may be made of an electrically conductive material and electrically connected to the ground, so that an electric current is applied between the working electrode 10, and the substrate 10 serving as an auxiliary electrode. In this case, the heat-generating ribbon 16 may consist solely of the electrically resistive layer 20, which is preferably made of a material having a specific resistance or resistivity higher than that of the magnetic layer 12. In the present embodiment, the electrically conductive substrate 10 functions as an auxiliary electrode which is held in indirect contact with the heat-generating ribbon 16.

While the present invention has been described in its preferred embodiment with a certain degree of particularity, it is to be understood that various changes, modifications and improvements may be made in the invention, without departing from the spirit and scope of the invention defined in the following claims.

What is claimed as new and desired to be secured by Letters Patent of the United States is:

1. A thermo-magnetic recording device wherein a magnetized latent image is produced on a magnetic layer by locally heating the magnetic layer, said thermo-magnetic recording device comprising:
   a heat-generating ribbon for generating heat upon energization thereof;
   at least one working electrode movable relative to said magnetic layer in a recording direction, and relative to said heat-generating ribbon in sliding contact with said heat-generating ribbon, said at least one working electrode locally holding said heat-generating ribbon in contact with said magnetic layer;
   feeding means for effecting a relative movement between said heat-generating ribbon and said at least one working electrode;
   at least one auxiliary electrode placed in direct or indirect contact with said heat-generating ribbon; and
   means for applying an electric current between said at least one working electrode and said at least one auxiliary electrode, to energize a local portion of said heat-generating ribbon which is currently in contact with said magnetic layer and said at least one working electrode, thereby causing the energized local portion of said heat-generating ribbon to generate heat for locally heating said magnetic layer to produce said magnetized latent image on the magnetic layer.

2. The thermo-magnetic recording device of claim 1, wherein said feeding means feeds said heat-generating ribbon relative to said at least one electrode, in said recording direction.

3. The thermo-magnetic recording device of claim 1, wherein said heat-generating ribbon consists of an endless tape, and said feeding means feeds said endless tape relative to said at least one working electrode, in a direction perpendicular to said recording direction.

4. The thermo-magnetic recording device of claim 1, further comprising a cylindrical drum made of a non-magnetic material, said cylindrical drum having an outer circumferential surface for holding thereon said magnetic layer.

5. The thermo-magnetic recording device of claim 4, wherein said heat-generating ribbon consists of an endless tape, and said cylindrical drum is rotatable about an axis parallel to said recording direction, said feeding means feeds said endless tape relative to said at least one working electrode, in a direction perpendicular to said axis of rotation of said drum.

6. A thermo-magnetic recording device wherein a magnetized latent image is produced on a magnetic layer by locally heating the magnetic layer, said thermo-magnetic recording device comprising:

a heat-generating ribbon for generating heat upon energization thereof;

at least one working electrode movable relative to said magnetic layer in a recording direction, and relative to said heat-generating ribbon in sliding contact with said heat-generating ribbon, said at least one working electrode locally holding said heat-generating ribbon in contact with said magnetic layer;

feeding means for effecting a relative movement between said heat-generating ribbon and said at least one working electrode;

at least one auxiliary electrode placed in direct or indirect contact with said heat-generating ribbon;

means for applying an electric current between said at least one working electrode and said at least one auxiliary electrode, to energize a local portion of said heat-generating ribbon which is currently in contact with said magnetic layer and said at least one working electrode, thereby causing the energized local portion of said heat-generating ribbon to generate heat for locally heating said magnetic layer to produce said magnetized latent image on the magnetic layer;

wherein said heat-generating ribbon comprises an electrically conductive layer and an electrically resistive layer, said feeding means comprising an electrically conductive roller supported rotatably in contact with said electrically conductive layer of said heat-generating ribbon, said at least one working electrode being placed in sliding contact with said electrically resistive layer, said at least one auxiliary electrode being constituted by said electrically conductive roller of said feeding means.

7. The thermo-magnetic recording device of claim 1, wherein said electrically conductive heat-generating ribbon consists of an electrically resistive layer, said at least one working electrode consisting of a plurality of working electrode, and said at least one auxiliary electrode consisting of a plurality of auxiliary electrodes corresponding to said plurality of working electrodes, each of said plurality of working electrodes and corresponding one of said plurality of auxiliary electrodes being spaced apart from each other by a predetermined distance and held in contact with said electrically resistive layer, said predetermined distance corresponding to a length of said local portion of said heat-generating ribbon to be energized by said electric current applied between the corresponding pair of working and auxiliary electrodes.

8. A thermo-magnetic recording device wherein a magnetized latent image is produced on a magnetic layer by locally heating the magnetic layer, said thermo-magnetic recording device comprising:

a heat-generating ribbon for generating heat upon energization thereof;

at least one working electrode movable relative to said magnetic layer in a recording direction, and relative to said heat-generating ribbon in sliding contact with said heat-generating ribbon, said at least one working electrode locally holding said heat-generating ribbon in contact with said magnetic layer;

feeding means for effecting a relative movement between said heat-generating ribbon and said at least one working electrode;

at least one auxiliary electrode placed in direct or indirect contact with said heat-generating ribbon; and means for applying an electric current between said at least one working electrode and said at least one auxiliary electrode, to energize a local portion of said heat-generating ribbon which is currently in contact with said magnetic layer and said at least one working electrode, thereby causing the energized local portion of said heat-generating ribbon to generate heat for locally heating said magnetic layer to produce said magnetized latent image on the magnetic layer;

wherein said magnetic layer is supported on an electrically conductive substrate, said means for applying an electric current applying the electric current between said at least one working electrode contacting said magnetic layer via said heat-generating ribbon, and said electrically conductive substrate, to locally heat said magnetic layer, whereby said electrically conductive substrate serves as said at least one auxiliary electrode.

9. The thermo-magnetic recording device of claim 1, wherein said magnetic layer is made of an electrically conductive material, and said at least one auxiliary electrode consists of an electrically conductive roller held in contact with one of opposite surfaces of said magnetic layer remote from said at least one working electrode, said means for applying an electric current applying the electric current between said at least one working electrode and said electrically conductive roller, to locally heat said magnetic layer.

* * * * *